US009222486B2

(12) United States Patent
Kadlicko et al.

(10) Patent No.: US 9,222,486 B2
(45) Date of Patent: Dec. 29, 2015

(54) ENGINE AUGMENTATION OF HYDRAULIC CONTROL SYSTEM

(75) Inventors: George Kadlicko, Rockford, IL (US); John Gregorio, Chana, IL (US); Tobin Gimber, Loves Park, IL (US); Jeffrey Maney, Rockford, IL (US)

(73) Assignee: Concentric Rockford Inc., Rockford, IL (US)

(*) Notice: Subject to any disclaimer, the term of this patent is extended or adjusted under 35 U.S.C. 154(b) by 797 days.

(21) Appl. No.: 13/450,044

(22) Filed: Apr. 18, 2012

(65) Prior Publication Data

US 2012/0260644 A1 Oct. 18, 2012

Related U.S. Application Data

(60) Provisional application No. 61/476,675, filed on Apr. 18, 2011.

(51) Int. Cl.

| | |
|---|---|
| ***F16D 31/02*** | (2006.01) |
| ***F15B 1/02*** | (2006.01) |
| ***F15B 21/14*** | (2006.01) |

(52) U.S. Cl.

CPC . *F15B 1/02* (2013.01); *F15B 21/14* (2013.01); *F15B 2211/20523* (2013.01); *F15B 2211/20546* (2013.01); *F15B 2211/20569* (2013.01); *F15B 2211/20576* (2013.01); *F15B 2211/27* (2013.01); *F15B 2211/625* (2013.01); *F15B 2211/633* (2013.01); *F15B 2211/88* (2013.01)

(58) Field of Classification Search

CPC ................................ F15B 1/024; F15B 1/033
USPC ................................................ 60/417, 418
See application file for complete search history.

(56) References Cited

U.S. PATENT DOCUMENTS 7,516,613 B2 4/2009 Kadlicko
7,712,309 B2 5/2010 Vigholm

FOREIGN PATENT DOCUMENTS

WO 2005078284 A1 8/2005

OTHER PUBLICATIONS

International Search Report and Written Opinion of the International Searching Authority; Application No. PCT/US2012/0347084; Issued: Jun. 26, 2012; Mailing Date: Jul. 5, 2012; 6 pages.

*Primary Examiner* — Edward Look
*Assistant Examiner* — Jason Mikus
(74) *Attorney, Agent, or Firm* — St. Onge Steward Johnston & Reens, LLC

(57) ABSTRACT

A power distribution system includes a prime mover and a hydraulic drive system. The hydraulic drive system includes an accumulator to store energy and supplement that available from the prime mover. A control monitors torque imposed on the prime mover and utilizes energy stored in the accumulator to offload the prime mover when its operating conditions are to be changed. Effecting a change under reduced load conditions mitigates inefficient operation of the prime mover.

15 Claims, 10 Drawing Sheets

EVENT MATH

T2 = Torque @ Axis ETM
T1 = Torque @ Drive Supply ETM
Da = ETM displacement @ Axis
Pa = Pressure @ Axis
Ps = Pressure @ Storage
Ds = Displacement @ Storage ETM
R1 = Gear Ratio @ Drive ETM
R2 = Gear Ratio @ Axis ETM
Dd = Displacement @ Drive ETM
Pd = Pressure @ Drive ETM

ENGINE AUGMENTATION OF HYDRAULIC CONTROL SYSTEM

CROSS REFERENCE

The present application claims the benefit under 35 U.S.C. §119(e) of the U.S. Provisional Patent Application Ser. No. 61/476,675, filed on Apr. 18, 2011, the content of which is incorporated herein by reference.

FIELD OF THE INVENTION

The present invention relates to energy transmission systems and more particularly to such systems utilizing hydraulic fluid as an energy transfer medium.

SUMMARY OF THE INVENTION

It is well-known to transfer energy from a source such as a motor or internal combustion engine to a load through the intermediary of hydraulic drive system. Such systems will typically have a pump driven by the source and a motor connected to the load. By adjusting the hydraulic flow between the pump and the motor it is possible to impart movement to the load, maintain it in a fixed position and otherwise influence its disposition.

The control of fluid flow is typically accomplished by a valve mechanism, which in its simplest form simply opens or closes the flow between the pump and motor and thereby regulates movement of the load. Such valve systems are relatively inefficient in terms of the energy dissipated across the valve. In a typical installation, the valve would be closed centred requiring the pump to deliver pressure against a relief valve. The energy provided to the fluid is thus dissipated as heat. In an open centre arrangement, careful manufacture of the valve is required in order to obtain the transition between the zero flow and full flow whilst retaining control of the load and metering of the flow across the valve causes loss of energy.

The valves used to control flow therefore are relatively complicated and made to a high degree of precision in order to attain the necessary control function. As such, the valves tend to be specialized and do not offer flexibility in implementing different control strategies. Most significantly, since the control is achieved by metering flow across an orifice there is inherently significant energy loss when controlling fluid flow. The control valve regulates movement by controlling flow across a restricted port at the inlet to the device. Because the control valve is typically a one piece spool, a similar restricted port is presented to the exhaust flow and results in a significant energy loss.

In order to reduce the operating forces required by a valve, it is known to utilize a servo valve in which a pilot operation is used to control the fluid flow. In such an arrangement, a pilot valve balances a pair of pilot flows and can be moved to increase one flow and decrease the other. The change in flows is used to move a control valve and operate the hydraulic device. The force required to move the pilot valve is less than that required for the control valve and therefore enhanced control is obtained. However, there is a continuous flow at high pressure through the pilot valve resulting in significant losses. The control valve itself also suffers deficiencies of energy loss due to metering flow across restrictive ports and therefore, although it offers enhanced control, the energy losses are significant.

In U.S. Pat. No. 7,516,613 there is disclosed a hydraulic transmission system in which variable capacity hydraulic machines are used to control movement of actuators along or about defined axes. The machines are driven from a prime mover through a mechanical transmission that allows power to be transferred from one machine to another. This permits energy recovered from the operations of one of the hydraulic machines to be redirected to a machine that is consuming energy, offering a saving in the energy consumption from the prime mover. In one of the embodiments described, a hydraulic accumulator is provided to store energy and subsequently supply energy to the transmission. The accumulator is connected to the transmission through a reversible, variable capacity hydraulic machine that is controlled to allow energy to flow to and from the accumulator. Control of the variable capacity hydraulic machine reduces the demand on the prime mover, allowing it to operate under steady state conditions for periods of time.

The rotational speed of the transmission is monitored so that when the load on the prime mover increases to a point where the prime mover is unable to meet the load, the output of the prime mover is increased. A change in operating conditions when the prime mover is under load can introduce inefficiencies. For example, where the prime mover is an combustion engine, such as a diesel or gas engine, the increased power output is provided by increasing the fuel supply to the engine. This is done under load and therefore an oversupply of fuel is required to accelerate the engine and increase power output. The oversupply of fuel is detrimental to the energy consumption of the system.

It is therefore an object to the present invention to obviate or mitigate the above disadvantages.

In general terms, the present invention provides a power transmission system incorporating a prime mover and a hydraulic drive system in which the hydraulic drive system is utilised to offload the engine during adjustment of the power output.

According therefore to one aspect of the present invention there is provided a method of controlling power distribution in a power transmission system having a prime mover drivingly connected to a hydraulic drive system. The hydraulic drive system includes an accumulator to store energy and an adjustable hydraulic machine to transfer energy between the accumulator and the prime mover. The method comprises the steps of determining the load imposed on the prime mover by the hydraulic drive system, comparing the load to the output of the prime mover to determine whether a change of operating condition of the prime mover is warranted, upon determining a change is warranted, supplying energy from said accumulator to offload said prime mover, and changing the operating condition of the prime mover whilst the load is reduced.

According to a further aspect, there is provided a power distribution system including a prime mover and a hydraulic drive system including an accumulator to store energy. An adjustable hydraulic machine transfers energy between the accumulator and the prime mover. A controller monitors loads on the prime mover and is operable to adjust the hydraulic machine to supply energy from the accumulator and offload the prime mover during change of operating conditions of the prime mover.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
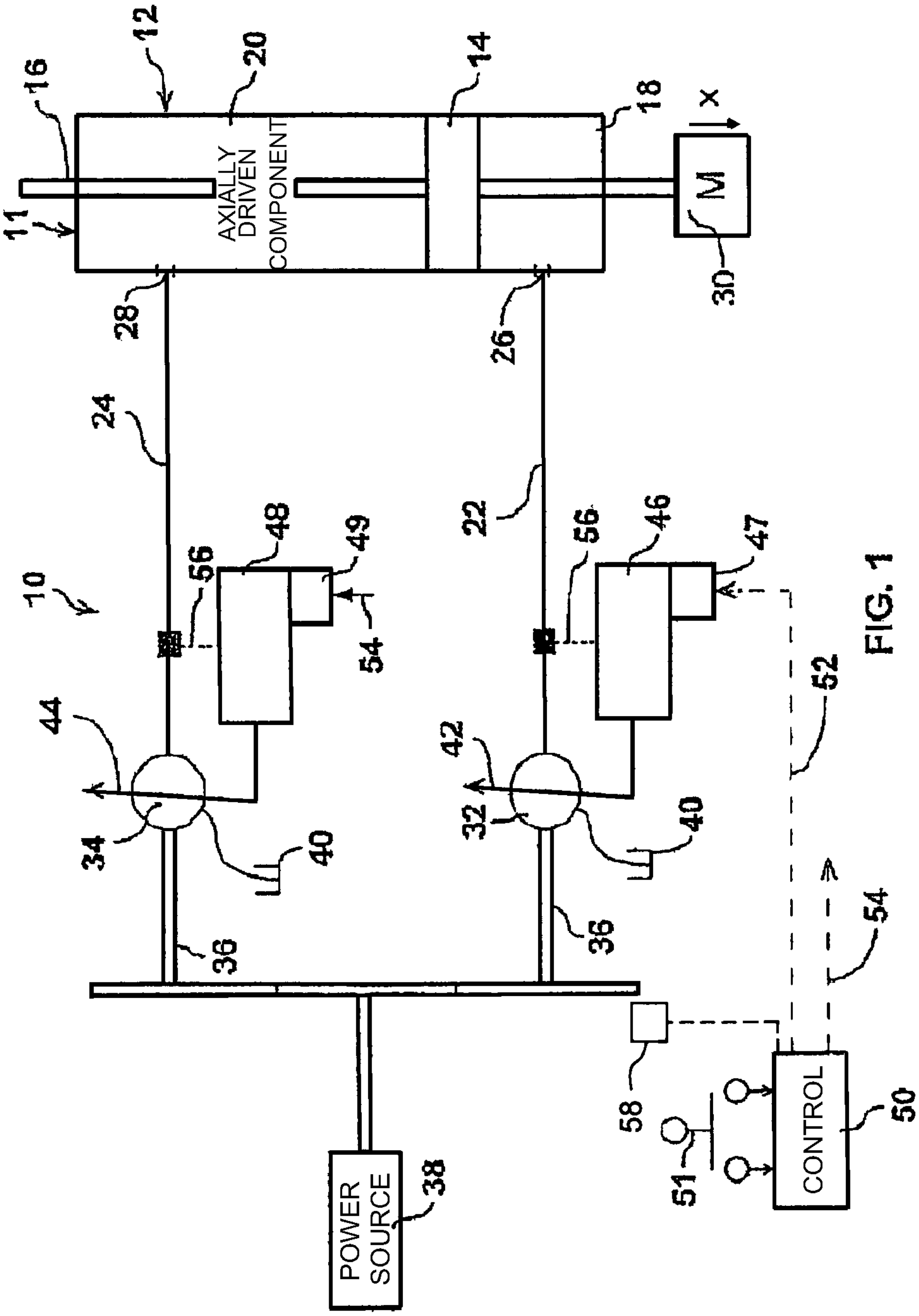
FIG. 1 is a schematic representation of hydraulic drive for a linear actuator.

To facilitate a full understanding of the operation of the energy transmission system, different configurations of hydraulic transmission will first be explained in the manner set out in U.S. Pat. No. 7,516,613. Thereafter, the integration of the control of the hydraulic transmission with that of the prime mover will be described. Referring therefore to FIG. 1, a hydraulic drive system 10 includes an actuator 11 having a cylinder 12 with a piston 14 supported within the cylinder 12. The piston 14 is connected to a piston rod 16 that extends from opposite ends of the cylinder 12. The piston 14 subdivides the cylinder 12 into chambers 18 and 20 which are connected to supply lines 22, 24 by ports 26, 28 respectively. The rod 16 is connected to a load 30 shown schematically as a horizontal sliding mass.

The supply lines 22, 24 are connected to the outlets of a pair of variable capacity hydraulic machines 32, 34. The machines 32, 34 are typically a swashplate device in which the angle of inclination of a swash plate determines the capacity of the machine. Alternatively, the devices could be a radial piston pump in which variation in the eccentricity of the control ring determines the capacity of the pump. The machines 32, 34 are over centre to permit each to operate in a pumping mode or motoring mode. The details of such machines are known and need not be described further. A particularly beneficial embodiment of such machines is described in co-pending application PCT/US2005/004723, the contents of which are incorporated by reference.

Figure 2:
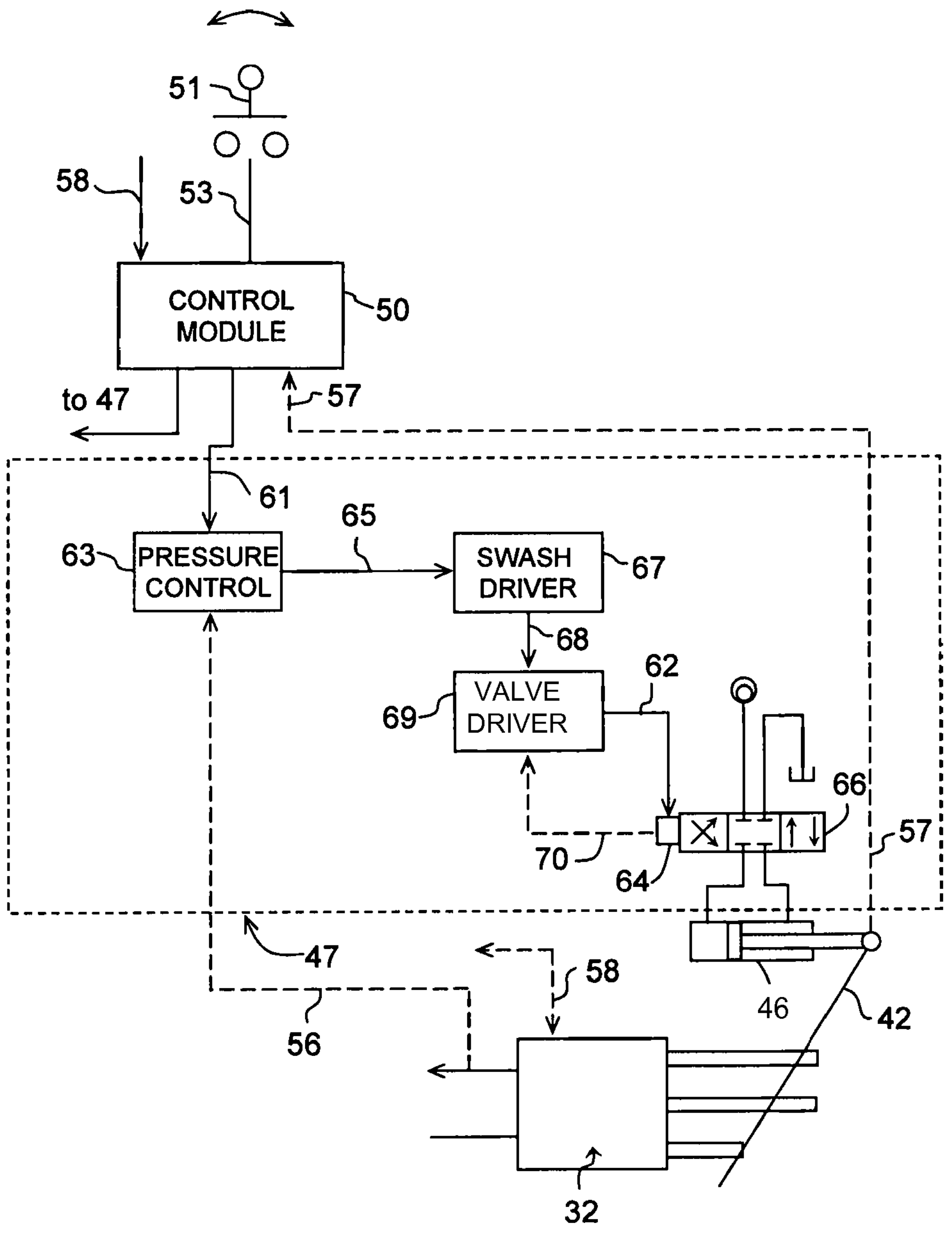
FIG. 2 is a representation in greater detail of a component used in the drive of FIG. 1.

The machines 32, 34 are coupled by a common drive shaft 36 to a prime mover 38. The machines 32, 34 receive fluid from and return fluid to a sump 40. Each of the machines has a capacity adjusting mechanism 42, 44 whose disposition may be adjusted by a swashplate adjusting motor 46, 48. The motors 46, 48, are independently operable and are controlled by respective control units 47, 49. As can be seen in greater detail in FIG. 2, each control unit 47, 49 receives a control signal from a control module 50 as a result of manipulation of a manual control 51. The control module 50 communicates with the control units 47, 49 through signal lines 52, 54 respectively. Each of the signal lines 52, 54 includes a reference pressure signal 61 and a swashplate position feedback signal 57. Input to the control module is provided by a controller 51, which is illustrated as a manual control although it will be appreciated that this could be generated automatically from other control functions or as part of a programmed sequence.

The control units 47, 49 are similar and therefore only one will be described in detail. The control units 47, 49 receive a pressure feedback signal from the supply lines 22, 24 respectively through an internal signal line 56. Feedback signals are also obtained for swashplate displacement through signal line 57 and rotational speed of the machine through signal line 58.

The pressure reference signal 61 and pressure feedback signal 56 are compared at a pressure control driver 63 that is connected through control line 65 to a swashplate driver 67. The swashplate driver 67 produces an output error signal 68. The error signal 68 is applied to a valve driver 69 whose output is a drive signal 62.

The drive signal 62 is applied to an actuating coil 64 of a closed centre valve 66 that controls movement of the motor 46 and therefore the capacity of the respective machine 32. The valve 66 has a valve position feedback signal 70 that is fed to the valve driver 69 so that the drive signal 62 is the difference between the error signal 68 and the valve position signal 70.

In operation, the load 30 is initially at rest and the capacity adjusting members 42, 44 are initially positioned with the machines 32, 34 at essentially zero capacity with maximum system pressure, typically in the order of 5,000 p.s.i. at each of the ports 26, 28. The machines 32, 34 attain this condition as the reference signal 61 is applied at the pressure control driver 63 and any loss of pressure will provide a signal to swashplate driver 67 to move the swashplate to supply fluid. This will cause an increase in pressure sensed in feedback line 56 and a net zero sum at the driver 67. In this condition, the drive shaft 36 simply rotates the machines 32, 34 without producing an output at the supply lines 22, 24. The fluid is essentially locked within the chambers 18, 20 and therefore movement of the piston 14 relative to the cylinder 12 is inhibited. Any leakage from the system causes a drop in pressure on the respective line 22, 24 and the consequential error signal from the pressure control driver 63 to adjust the respective member 42, 44 to maintain the pressure.

In order to move the load 30, the manual control 51 is moved in the direction in which the load is to be moved, which is indicated by arrow X in FIG. 1. For the purpose of the initial description, it will be assumed that the control 51 provides a simple fixed value step function, i.e. “on” or “off” to the control module 50. Subsequent embodiments will describe alternative control strategies. Upon movement of the manual control 51, a signal 53 is provided to the control module 50 which generates corresponding signals in the control lines 52, 54, in this case 52, to effect movement in the required direction.

The pressure reference signal 61 is set to require a nominal minimum pressure, e.g. 100 psi at port 26, so that the signal on control line 65 also indicates an increase in capacity of the machine 32 in the motoring mode to reduce pressure at port 26. The swashplate driver 67 thus provides an output error signal 68 to the valve driver 69 indicating a required position of the valve that causes the machine 32 to be placed in the motoring mode to reduce the pressure in the port 26 and allow fluid to flow from the chamber 18. The valve position feedback signal 70 indicates a neutral position of the valve 66 so a valve drive signal 62 is applied to the actuator 64 to reduce the error and thereby open the valve 66.

Initially, the capacity of the machine 32 will increase sufficiently for the pressure at port 26 to drop and the signal 57 to correspond to the reference signal 61 from the controller 50. The control signal 65 is thus reduced to zero. The valve position feedback signal 70 thus acts through the valve driver

69 to close the valve 66 and inhibit further movement of the swashplate 42. Any further increase in the capacity of the machine will reduce the pressure at port 26 below that set by the reference pressure 61 and the control signal 65 will act to reduce the capacity and restore the pressure to that of reference value 61.

As the pressure at port 26 decreases, the pressure in chamber 20 is maintained at the maximum set value as the reference signal 61 associated with control unit 49 has not been modified. The pressure differential acting across piston 14 initiates movement of the piston 14, which, in turn, reduces the pressure at port 28. The pressure control drive 63 of the control unit 49 thus generates a control signal 65 that produces an output error to the swashplate driver 67 and causes the machine 34 to increase capacity in a pumping mode to maintain the reference pressure. Movement of the piston 14 induces a flow from the port 26 and the pressure at the port 26 will again increase above the nominal set pressure. The pressure control signal 65 is then operative through the swashplate driver 67 to increase the capacity of the machine 32 in the motoring mode whilst maintaining the required nominal pressure. The pressure differential across the piston 14 will thereby accelerate the mass 30. As the mass 30 accelerates, the capacity of the machine 34 will continue to increase in the pumping mode to supply fluid to maintain the reference pressure and the capacity of the machine 32 will likewise increase in the motoring mode to maintain the nominal set pressure. The mass 30 will continue to accelerate and the capacity of the machines 32, 34 adjusted under the pressure compensating control to maintain their respective set pressures at the ports 26, 28. When the machine 34 attains maximum capacity, the mass is no longer capable of being accelerated but a steady state velocity is attained in which pressure at the port 28 is maintained at the maximum reference pressure and the pressure at the port 26 is maintained at the nominal low pressure.

In the simplest form of control provided by the manual control 51, the actuator 11 will continue to move the mass 30 in the direction set by the control 50. When the desired position of the mass 30 has been obtained, as observed by the operator, the manual actuator 51 is returned to a neutral position causing the reference pressure 61 to be increased to the maximum pressure. To attain the pressure indicated by reference signal 61, the capacity of the machine 32 will be reduced to cause the pressure in the port 28 to increase to the set value. The pressure differential across the piston 14 is removed and the mass 30 decelerates. The capacity of the machine 34 will therefore also be reduced to maintain the pressure at the set value and as the mass decelerates, the machines 32, 34 both reduce progressively to minimum capacity. The pressures at ports 26, 28 are then identical and maintain the load 30 stationary. It should be noted that during movement, modulation of the reference pressure 61 is only applied to the machine 32 and the machine 34 simply operates in a pressure compensated mode to follow the movement of the piston 14.

Movement of the manual control 51 in the opposite direction will likewise apply a control signal through the signal line 54 to generate a drive signal at valve 66 of control unit 49 and a reduction of the required pressure to increase the capacity of the machine 34 and produce a corresponding motion in the opposite direction.

During movement of the load 30, the swashplate position feedback signal 57 is supplied to the control module 50 to provide an indication of the mode of operation of the machine, i.e. pumping or motoring, and to provide for anticipatory control in modifying the reference pressure signal 61.

Figure 9:
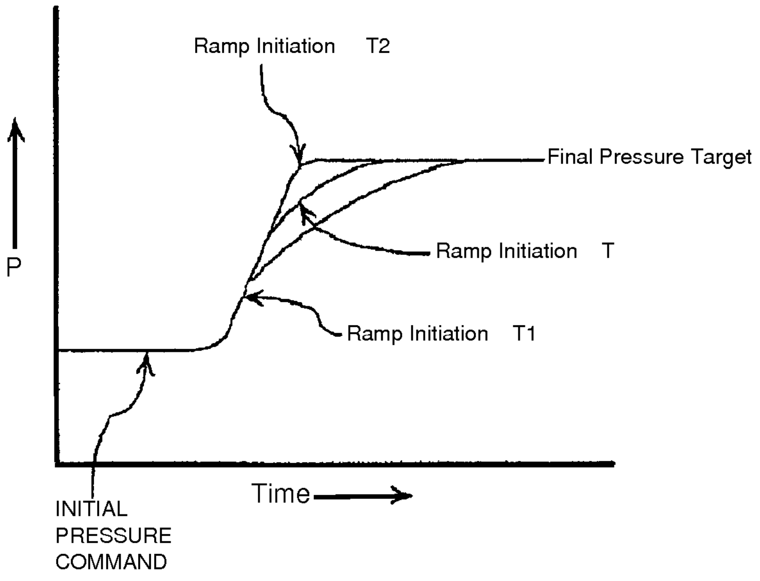
FIG. 9 is a response curve showing different responses under different operating conditions.

In order to accommodate differing operating conditions, as shown in FIG. 9, the rotational speed feedback signal 58 is used to vary the initiation of the ramp function and obtain the optimum response in the pressure control. As the pressure rises in the supply in response to an increase in the reference signal 61, as sensed in pressure sensing line 56, a ramp initiation point T is reached at which the control 50 modifies the pressure signal to control 63. The control 50 also receives the rotational speed feedback signal 58 and modifies the initiation point, as indicated by T1 and T2 in inverse proportion to the sensed speed. At low speed of rotation, the pressure gain (rate of pressure increase) is low since the time for system response is lengthened in view of the relatively low rate of pumping and motoring within the machines 34, 32. However, at higher rotational speed, the pressure gain rate is much higher. Accordingly, at higher RPM, the initiation point T1 is at a lower pressure and at lower RPM, the initiation point T2 is at a higher pressure. In this way, the system response may be matched to the varying operating conditions of the system.

The provision of machine rotational speed through feedback 58 may be used to vary the response of the machines to changes in the reference pressure signal 61. To provide optimum response, i.e. inhibit overshoot and minimize undershoot, the control signal to valve 66 is modified by a ramp function.

Alternatively, the angular disposition of the swashplate 42, 44 may be used to modify the onset of the modification. In this case, as the pressure rises in the supply in response to an increase in the reference signal 61, as sensed in pressure sensing line 56, a ramp initiation point T is reached at which the control 50 modifies the pressure signal to control 63. The control 50 also receives the swashplate position feedback signal 57 and modifies the initiation point, as indicated by T1 and T2 in inverse proportion to the sensed position. At low swashplate angles, the pressure gain (rate of pressure increase) is low since the time for system response is lengthened in view of the relatively low rate of pumping and motoring within the machines 34, 32. However, at higher swashplate angles, the pressure gain rate is much higher. Accordingly, at higher swashplate angles, the initiation point T1 is at a lower pressure and at lower swashplate angles, the initiation point T2 is at a higher pressure. In this way, the system response may be matched to the varying operating conditions of the system.

The provision of swashplate position through feedback 57 may be used to vary the response of the machines to changes in the reference pressure signal 61. To provide optimum response, i.e. inhibit overshoot and minimize undershoot, the control signal to valve 66 is modified by a ramp function.

It will be appreciated by utilizing the variable capacity machines 32, 34 on a common drive, the energy of fluid discharged from the collapsing chamber may be redirected through the shaft 36 to either the prime mover, the machine that is in pumping condition or additional machines as will be described in further detail below.

The flow of fluid from the collapsing chamber (18 in the above example) produces a torque as it flows through the respective machine 32. The torque produced will depend in part on the capacity of the machine and is applied to the drive shaft 36 to supplement the torque applied by the prime mover 38. In some cases, for example where movement of the load 30 is assisted by gravity, the torque obtained from one machine may be sufficient to maintain the set pressure in the other machines but in other cases energy from the prime mover 38 will be required in addition to the torque recovered. Where additional torque is required, the prime mover is controlled as set forth below with reference to FIG. 10 to supply the additional torque.

The deceleration of the mass 30 also provides a source of energy that may be recovered through the mechanical linkage of the machines 32, 34. As noted above, as the control 51 is returned to the neutral position, the machine 32 is conditioned to maintain the maximum reference pressure. Continued movement of the mass 30 due to its kinetic energy must therefore act against the maximum pressure through the machine 32 which is still in the motoring mode. The machine 32 is thus driven by the fluid expelled from the chamber 18 and a significant torque is applied to the drive shaft 36. Torque is applied until the mass is brought to rest with both swashplates returned to essentially zero capacity.

In some situations, the load 30 may be decelerated at a maximum rate by the operator moving the control 51 in the opposite direction, i.e. through the neutral position. Such movement would cause the signals applied through signal line 54 to indicate a nominal low pressure is required in the port 28 and a maximum pressure in the port 26. The machine 32 thus decreases its capacity to maintain the maximum pressure and the machine 34 similarly reduces its capacity but at a rate that maintains only a nominal low pressure in the port 28. The maximum pressure differential is then applied to decelerate the mass and bring it to rest. The swashplates move progressively to zero displacement at which time the control 51 may be released and an equal pressure balance applied to each chamber. If the control 51 is maintained in the reversed position, the machine 34 will move to a motoring mode and the machine 32 to a pumping mode and movement of the load in the opposite direction will commence.

As discussed above, the manual control 51 is either 'on' or 'off' but a proportional signal may be incorporated in the manual control 51 to obtain a progressive response such that the rate of movement of the load is proportional to the movement of the control 51 from neutral. In this case, the magnitude of the control signal 53 is proportional to the movement of the control 51. The signal 52 will establish a reference pressure signal for the pressure compensation that is proportional to the displacement of the control 50. Assuming that movement of the mass in the direction of arrow X is required, the capacity of the machine 32 will be adjusted so that the pressure at port 26 attains this value. The pressure at port 28 is maintained at the reference level so that the pressure differential across the piston 14 may thus be modulated and the acceleration controlled.

Figure 3:
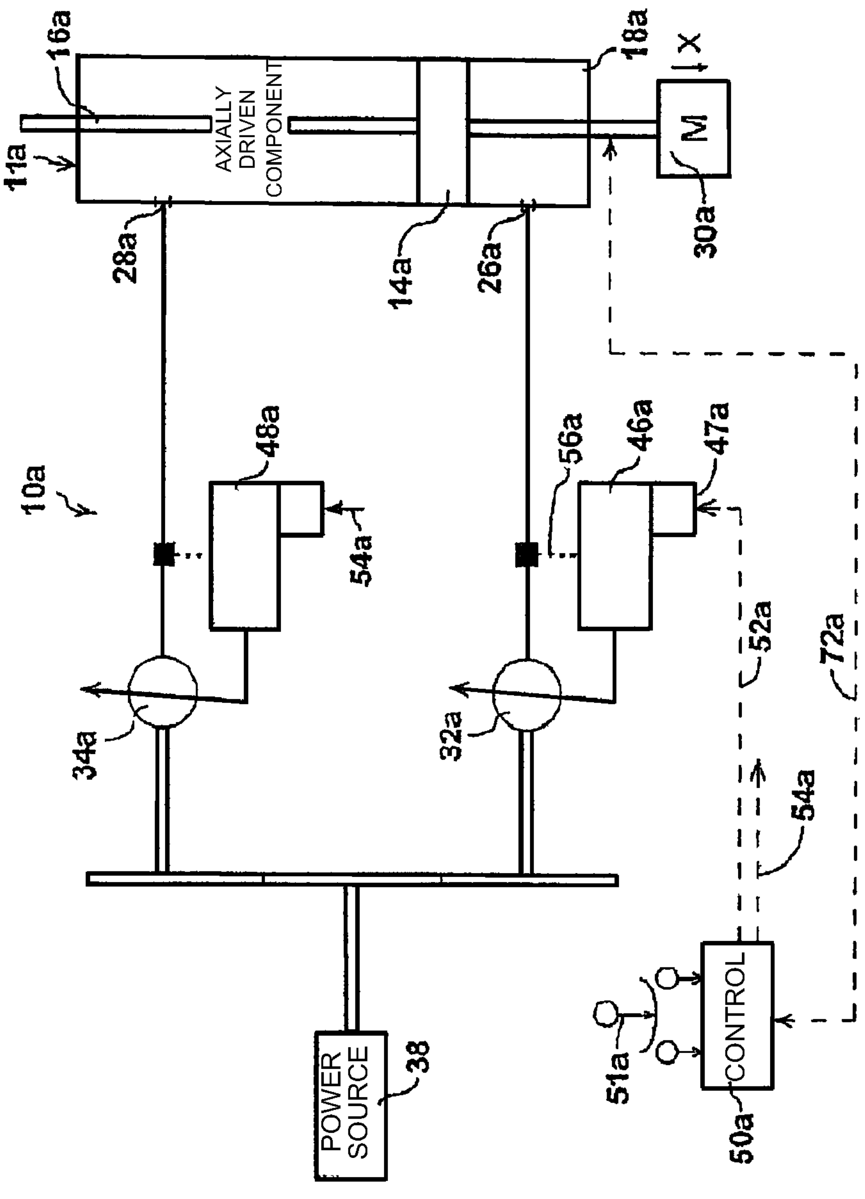
FIG. 3 is a schematic representation similar to FIG. 1 of a linear actuator with a modified control.

The arrangement shown in FIG. 1 provides a simple manual feedback but the control signal may be modified to provide for a position control of actuator 18 as illustrated in FIG. 3 in which like reference numerals are used to denote like components for the suffix 'a' added for clarity. In the embodiment of FIG. 3, the manual control 51*a* provides a proportional control signal to control module 50*a*. A position feedback signal 72*a* is obtained from the piston rod 16*a* of the actuator 11*a* and is also fed into the control 50*a* to obtain an error signal indicating the difference between the desired position, as represented by manual control 51*a*, and the actual position represented by the signal 70*a*. The control module 50*a* generates a pressure reference signal 61*a* on a control signal line 52*a*, which is applied to the respective control unit 47*a* of motor 46*a* to condition the machines 32*a*, and move the piston 14*a* in the required direction. Assuming the load 30*a* is to be moved in the direction of arrow X shown in FIG. 3, the machine 32*a* increases capacity in an attempt to attain a reduced pressure at port 26*a* corresponding to that set by the reference signal 61*a* and fluid flows from the chamber 18*a*. The machine 34*a* applies the maximum reference pressure to move the load 30*a* and varies the capacity to maintain that pressure. As the desired position is obtained, the position signal 72*a* varies and the difference between the manual control 51*a* and position signal 72*a* is reduced to essentially zero. The swashplates return progressively to zero displacement and any movement from this desired position produces an error signal at control module 50*a* to condition an appropriate pressure reference signal 61*a* and return the load to the desired position. The capacity of the machine 32*a* is thus progressively reduced to increase the pressure and a corresponding decrease in capacity of machine 34*a* until the load 30*a* is brought to rest at the desired location.

Figure 4:
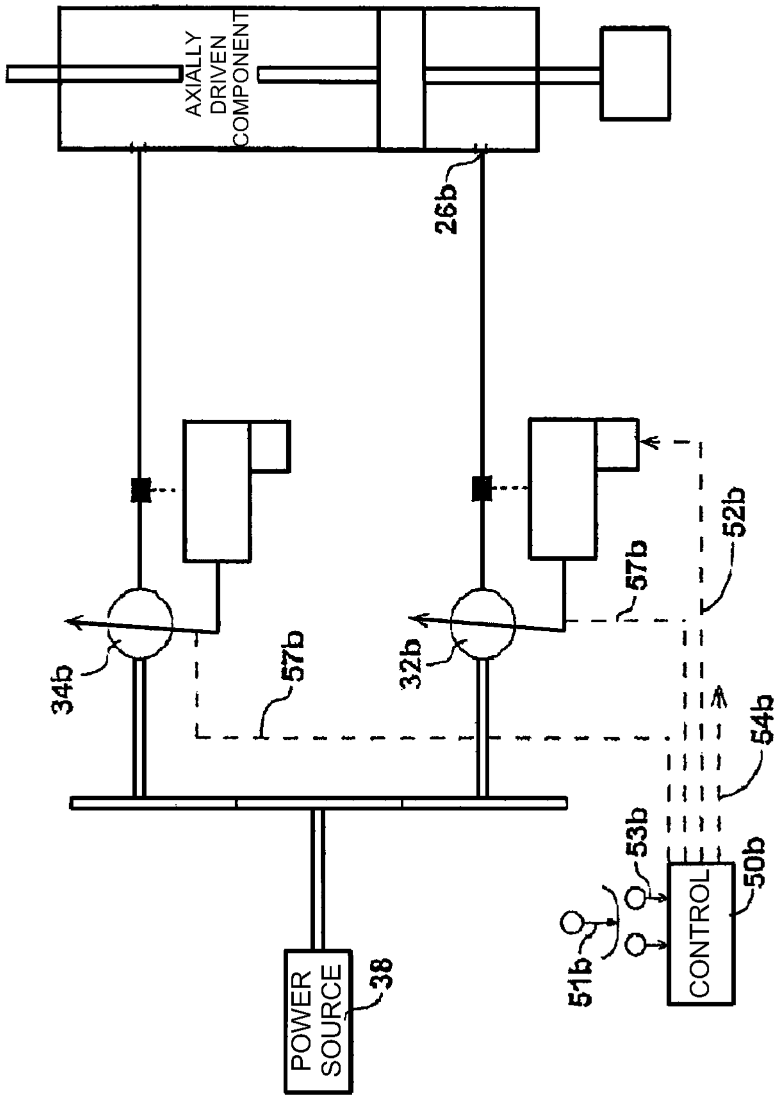
FIG. 4 is a schematic representation of a linear actuator similar to FIG. 1 implementing a further control function.

The control of the arrangement of FIG. 1 may also be modified to provide for a velocity control in which the maximum velocity is limited. Like components will be denoted to like reference numeral with a suffix b added for clarity. In the embodiment of FIG. 4, rather than the monitor the position of the load, as described in FIG. 3, the capacity of the machine 32*b*, 34*b* is monitored and used as an indication of velocity. Referring therefore to FIG. 4, the manual control at 51*b* provides an output signal proportional to the desired velocity to be obtained which produces a control signal 52*b* causing the machine 32*b* to move to a motoring mode and the reference pressure reduced to a nominal low value. The capacity of machine 32*b* is increased in the motoring mode to reduce the pressure at port 26*b*, resulting in acceleration of the load.

The capacity of the machines 34*b*, 32*b* increases until the indicated capacity through feedback signal 57*b* corresponds to that set by the control 51*b*. The error signal is thus removed and the capacity of the machine 32*b* reduced to establish the reference pressure. The reference pressure of machine 34*b* is at a maximum value so that the load is again accelerated until the capacity of the machine 32*b* as indicated through feedback signal 57*b* matches the input signal 52*b* from control 51*b*. As the machines reduce capacity progressively, the swashplate position feedback 57*b* again introduces an error signal that causes the machine 32*b* to increase capacity so as to reduce pressure Accordingly, a steady velocity, intermediate that limited by the maximum capacity of the machines, is attained. Such a control may be useful for an automated process such as a machine tool drive or the like.

The above linear actuators have been described with a double sided actuator but it will be apparent that they may equally well be used with the single sided actuator i.e. one in which the piston rod projects from one side of the actuator and the chambers have a different area. The corresponding reference signals 61 may be adjusted in proportion to the difference in areas between the rod and piston side chambers to control movement of the cylinder in a manner similar to that described above with respect to FIG. 1.

Figure 5:
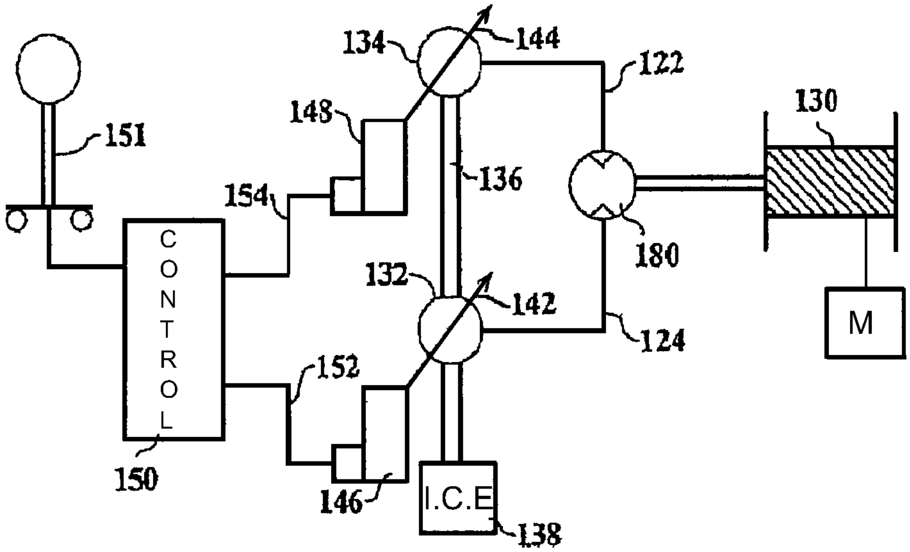
FIG. 5 is a schematic representation of a rotational drive.

A similar control structure may be utilized for a rotary drive, such as might be used for a winch or similar application. Such arrangement is shown in FIG. 5 in which like reference numerals will be used to denote like components but with a prefix 1 for clarity of description. A pair of variable capacity hydraulic machines 132, 134 are hydraulically connected through hydraulic lines 122, 124 to a fixed capacity rotary machine 180. A prime mover 138 is mechanically connected to each of the machines 132, 134 and a winch assembly 130 connected to the machine 180. The machines 132, 134 are controlled by motors 146, 148 with control signals 152, 154 being applied by a control module 150. With the mass stationary, each of the adjusting members 142, 144 are set at essentially zero capacity with a hydraulic lock in the supply lines 122, 124. The pressure compensation of the machines ensures that pressure is maintained in the system to lock the motor and inhibit rotation of the winch.

Upon a signal from the actuator to rotate the winch 130, the signal to the motor 132 indicates a reduced pressure requiring an increased capacity in the motoring mode. As fluid is delivered in the supply line 122, the pressure compensated control of the machine 134 adjusts to maintain the pressure at the set pressure controlled causing rotation of the winch assembly 130. The positional and velocity controls indicated above may be utilized to control the movement of the load and maintain it in a desired position. Once the position has been attained, the error signal is removed, either by release of the manual control 151 or feedback from the position or velocity control, the swash plates 144, 142 return progressively to a essentially zero position in which no energy is transferred through the system but the load is maintained via pressure on both sides of the motor.

It will be seen therefore that in each of the above embodiments, a pair of pressure compensated variable capacity machines may be utilized to control operation of an actuator.

The pressure compensation permits a minimum of energy to be utilized to hold the actuator and, by overriding the set pressure on the discharge of the actuator, a controlled movement of the actuator is obtained. Modulation of only one of the machines is required with the other machine following to maintain a set pressure and apply a motive force. The mechanical coupling of the machines may be used to enable energy to be recovered from the efflux of fluid from the actuator and applied to the machine providing motive force.

Figure 6:
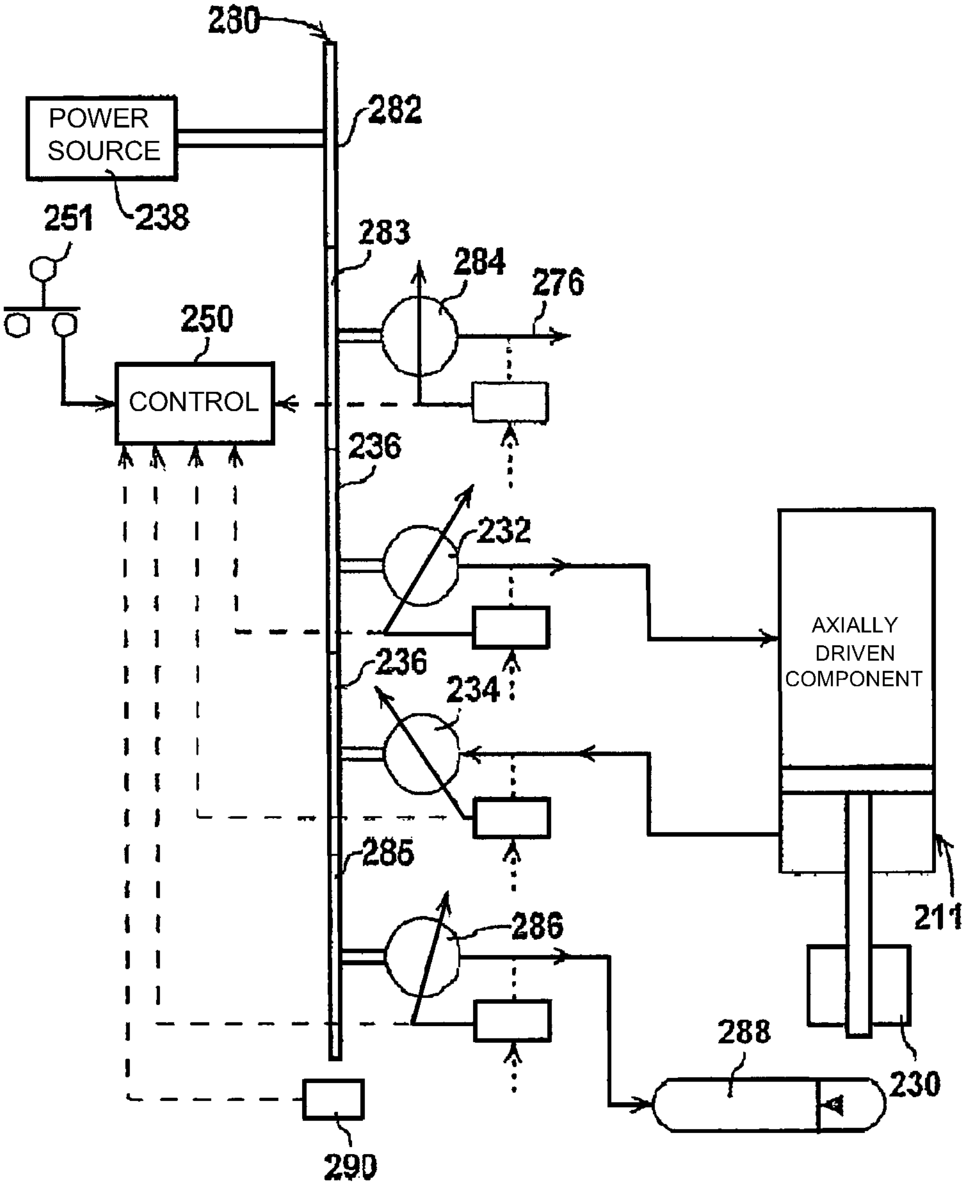
FIG. 6 is a schematic representation of a further embodiment of drive with enhanced energy recovery capabilities.

As noted above, the mechanical linking of the machines 32, 34 permits energy recovery under certain conditions. The energy recovery may be enhanced by adoption of the arrangement shown in FIG. 6. Like reference numerals will be used to denote like components with a prefix 2 added for clarity. In the embodiment of FIG. 6, a pair of variable capacity machines 232, 234 are connected to an actuator 211 connected to a load 230. Each of the machines 232, 234 include pressure compensating controls and are operated from a manual control 251 through control 250 as described above. The machines 232, 234 are mechanically linked by a pair of meshing gears 236 so that they rotate in unison. Drive for the machines is provided by a prime mover 238 through a gear train 280, including gears 282, 283.

An auxiliary hydraulic drive 284 is connected to the gear 283 and supplies fluid to an auxiliary service 276. The drive 284 may be fixed or variable capacity and may be controlled as the machines 232, 234 if appropriate. The gear train 280 also includes a gear 285 that drives an additional variable capacity hydraulic machine 286. The machine 286 is connected to a hydraulic accumulator 288 that is operable to store and discharge fluid through the machine 286 and thereby absorbs energy from or contribute energy to the gear train 280. A speed sensor 290 is provided to monitor the speed of the gear train 280 and interface with the control module 250

In operation, the accumulator is initially empty and it is assumed that the auxiliary drive 284 is supplying a steady flow of fluid to the service 276. The mass 230 is moving at a constant velocity under the action of the machines 232, 234 and the prime mover 238 is supplying energy to the gear train 280 sufficient to fulfill the requirements. If the mass 230 is decelerated at a maximum rate, as described above, the machine 234 is conditioned to a maximum pressure in the motoring mode and significant torque is generated to accelerate the drive train 280. The torque supplied by the machine 234 is used to drive the machine 284 and supply fluid to the auxiliary service 276. If the torque cannot be absorbed in this manner, the gear train will accelerate and a speed sensor 290 signals the control 250 to increase the capacity of the additional machine 286 in a pumping mode. The machine 286 therefore delivers fluid under pressure to the accumulator 288 at a rate that absorbs the torque available and maintains the desired speed of the gear train 280.

As the mass 230 is brought to rest, the torque supplied to the gear train decreases and the speed drops. The control 250 causes the machine 286 to reduce the pumping action and return to essentially a zero capacity due to lack of energy induced via the machine 234 with energy stored in the accumulator 288. Similarly, if during deceleration, the auxiliary service 276 demands more energy, the speed of the gear train 280 will decrease and an adjustment made to the machine 286. The energy available from the machine 232 is thus redirected to the auxiliary service 276 and the remainder, if any, is available to pump the accumulator 288.

If the load imposed by the service 276 continues to increase, the energy stored in the accumulator 288 is made available to maintain the desired speed of the gear train 280. A continuing increased load will again cause the speed of the gear train 280 to decrease and cause the control 250 to move the additional machine 286 in to a motoring mode. The pressurised fluid available in the accumulator is applied to the machine 286 to generate a torque in the gear train and thereby maintain the desired speed. The swashplate of the machine 286 is modulated to maintain the speed at the desired level until all energy (or a low threshold value) in the accumulator 288 is dissipated. At that time, further energy requirements are met by adjusting the prime mover 238, as will be described below. The mechanical connection of the accumulator 288 through the machine 286 and its modulation to maintain the speed of the gear train 280 within desired limits enhances the utilisation of the recovered energy.

Figure 7:
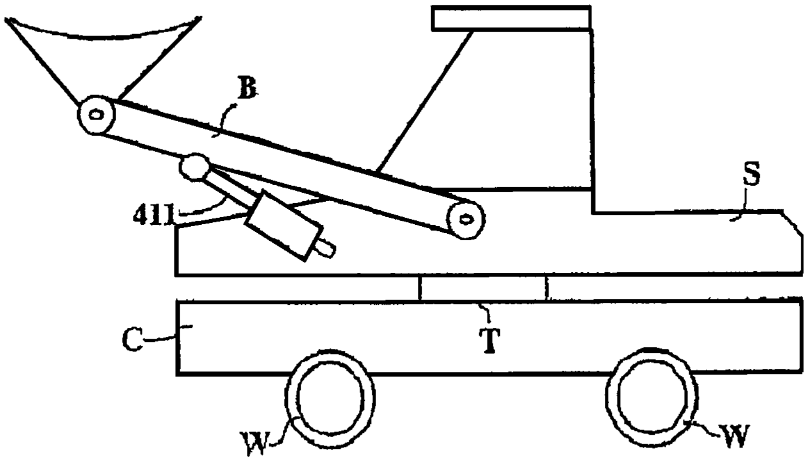
FIG. 7 is a view of vehicle incorporating a hydraulic transmission.
Figure 8:
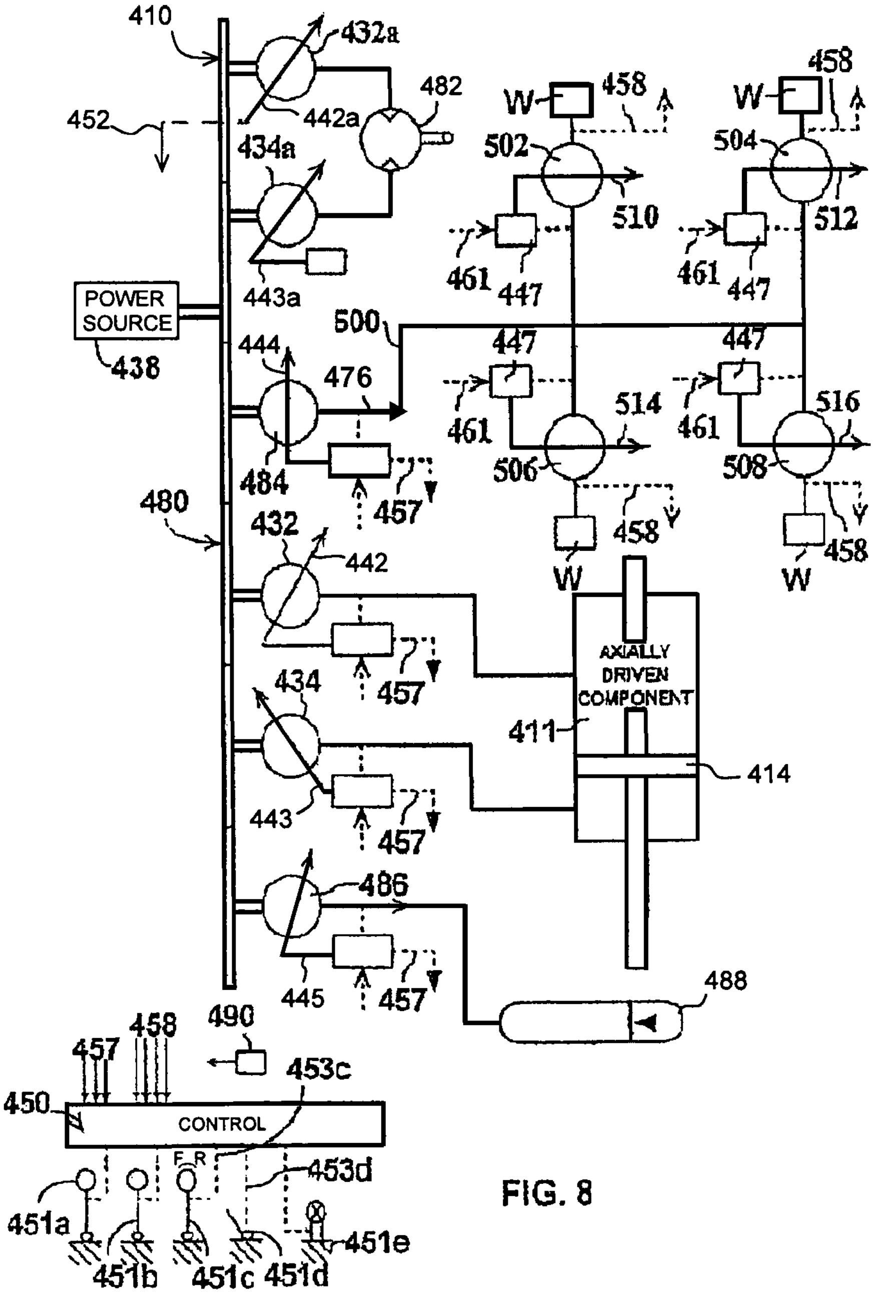
FIG. 8 is a schematic representation of the hydraulic transmission utilised in FIG. 7.

The systems described above may be integrated in to the control strategy of more complex machines, as illustrated in FIGS. 7 and 8 in which like reference numerals will be used with a prefix "4" to denote like components. Referring therefore to FIG. 7, a vehicle V includes a chassis structure C supported upon drive wheels W. A superstructure S is located on the chassis structure C and is rotatable about a vertical axis on a turntable T. A boom assembly B is pivotally mounted to the superstructure S for movement in a vertical plane. A boom actuator 411 is connected between the superstructure S and the boom assembly B and is operable to elevate and lower the boom.

The vehicle V has a power distribution system that includes a prime mover 438 connected to a hydraulic drive system 410 through a gear train 480 as shown in greater detail in FIG. 8. As can be seen from FIG. 8, the prime mover 438, which may be an electric motor or internal combustion engine, provides an input into a mechanical gear train 480 that transmits the drive to a number of variable capacity hydraulic machines 432, 432*a*, 434, 434*a*, 484 and 486. Each of the hydraulic machines 432, 432*a*, 434, 434*a*, 484 and 486 are of variable capacity and have a capacity adjusting member 442, 442*a*, 443, 443*a*, 444, 445 respectively. The machines 432, 432*a*, 434, 434*a*, 484 and 486 are typically adjustable swashplate machines having an inclinable swashplate acting upon axially reciprocating pistons within a rotating barrel as discussed above with reference to the previous embodiments.

Drive for the boom actuator 411 is provided by a pair of machines 432, 434 through a manual control 451*a* that controls flow to either side of the piston 414 as described above with reference to FIGS. 1, and 2. Similarly, the turntable T is operated by a rotary motor 482 through a manual control 451*b* that controls a pair of machines, 432*a*, 434*a* in the manner described above with respect to FIG. 5. An additional machine 486 transfers energy between an accumulator 488 and gear train 480 as described above with respect to FIG. 6.

The hydraulic machine 484 is pressure compensated as described above with respect to FIG. 2 and the auxiliary service 476 is connected by a supply conduit 500 to wheel drives 502, 504, 506 and 508. Each of the wheel drives 502, 504, 506 and 508 drive a respective one of the wheels W and are each variable capacity reversible hydraulic machines with control units 447 similar to those described in reference to FIG. 2. Each has an adjusting member 510, 512, 514, 516 controlled by respective valves. The hydraulic machines 510-516 are of similar construction to the machine 32, 34, and need not be described in further detail.

The capacity of each of the drives 502-508 is controlled by a swashplate position signal 461 generated by a control module 450. Each of the drives 502-508 also provide a speed of rotation signal 458 on signal lines 452 for monitoring the operation of each machine.

Operator control of the transmission is provided to control module 450 via manual controls 451*c*, 451*d*, 451*e*. The manual control 451*c* controls the direction and speed of propulsion of the vehicle V, the control 451*d* controls the braking of the vehicle V, the control 451*e* steers the vehicle V. These are typical controls and it will be appreciated that other commonly used interfaces could be employed.

The operation of the hydraulic drive system will now be described assuming initially that the vehicle is at rest and the boom locked in a lowered position. With the vehicle at rest, the capacity of each of the machines 432, 434, 432*a*, 434*a* is at essentially zero capacity and maintaining maximum set pressure. The wheel drives 502-508 similarly set at minimum capacity to deliver zero torque and the machine 484 is at essentially zero capacity maintaining a maximum pressure in the conduit 500. Essentially, this setting is simply sufficient to replenish any leakage within the system but to produce no vehicle movement.

The accumulator 488 is fully discharged and the capacity of the additional machine 486 is at a minimum. With each of the machines 432, 434, 432*a*, 434*a*, 484, 486 at a minimum, the prime mover 30 is simply rotating the respective machines without producing any output and therefore is at minimum power requirements.

To initiate movement of the vehicle V, the operator moves the control 451*c* in the required direction of movement and provides an appropriate control signal 453*c* to the control module 450. Typically, this will be proportional signal indicative of not only the direction but the torque input at the wheels which will determine the rate of movement of the vehicle. The control module 450 provides a control signal to the wheel drives 502-508 to attain a torque setting (displacement) corresponding to the input signal from the control 450. This will be a proportional torque setting indicating a corresponding proportional capacity of the machine. For maximum acceleration, this will correspond to a maximum displacement. As the capacity of the wheel drives 502-508 increases under the control of the respective swashplates 510-516, the pressure in the supply conduit 500 decreases causing the pressure compensation of the machine 484 to increase the capacity of that machine. The resultant torque from drives 502-508 enabled by flow of fluid through the conduit 500 causes rotation of the wheel W and propulsion of the vehicle.

The capacity of the wheel drives 502-508 will continue to increase until the swashplate position feedback 457 indicates the desired capacity has been attained and the required torque is delivered at each wheel. During this time, the pressure within the conduit 500 will be maintained by increasing the capacity of the machine 484 under pressure compensating control. Unless otherwise interrupted, either by adjustment of the control 451*c* or increased load on the vehicle, the vehicle V will accelerate until the machine 484 reaches an equilibrium when the external loads match the torque available.

When the vehicle has attained the desired velocity, the operator releases the control 451*c* to reduce the capacity of the wheel drives 502-508 and consequently the torque, to inhibit further acceleration and maintain the desired velocity. The machine 484 reduces its capacity to maintain the pressure at the maximum value whilst maintaining a flow through the wheel motors. A steady state is reached at which the torque supplied to the wheels W matches the load on the vehicle V. Under certain conditions, for example coasting downhill, no torque is required to maintain the desired speed and the wheel drives 502-508 and machine 484 are returned to essentially zero capacity. In this condition, the vehicle is simply coasting with no net power supplied to the wheels 14.

To brake the vehicle V, the brake control 451*d* is actuated (which may be integrated with the control 451*c* if appropriate). The application of the brake control 451*d* generates a proportional signal 453*d* to the control 450 that conditions each of the wheel drives in to a pumping mode at a selected capacity. The swashplates 510-516 are thus moved from the motoring mode overcentre to the pumping mode and cause an increase in the pressure in the conduit 500. The machine 484 initially reduces its capacity and then goes overcentre in to a motoring mode under the action of pressure control to maintain the maximum set value. The swashplate feedback signal 461 holds the wheel drives at the capacity indicated by the braking control 451*d* and pumps fluid under the maximum pressure through the machine 484. The torque required to do this is derived from the momentum of the vehicle and therefore brakes the vehicle V. The conditioning of the machine 484 to a motoring mode results in energy being supplied from the machine 484 into the gear train 480.

The energy supplied to the gear train 480 causes the components of the gear train, including the prime mover, to accelerate. The speed of rotation of the gear train is monitored by speed sensor 490 and an increase in that speed is detected by the control module 450. This conditions the machine 486 associated with the accumulator 488 to move into a pumping mode and supply fluid under pressure to the accumulator 488. The displacement of the machine 486 is controlled to maintain the speed of the gear train 480 at the set speed. The accumulator is thus charged by the energy recovered from the braking of the vehicle.

The store of energy will depend upon the braking effort with the machine 486 modulating the capacity to maintain the speed of the gear train 480 at the desired level.

Upon removal of the braking control 451*d* and reapplication of the speed control 451*c*, wheel drives 502-508 are once again conditioned into motoring modes and the machine 484 reverts to a pumping mode to maintain the pressure in the conduit 500.

As the machine 484 moves to supply energy into the conduit 500, an initial decrease in the rotational speed of gear train 480 is sensed and the machine 486 is conditioned into a motoring mode to supply energy from the accumulator 488 into the gear train 480. The energy that has therefore been stored in the accumulator 488 during braking is made available to the vehicle transmission during a further acceleration cycle. Upon exhausting of the accumulator 488, a decrease in engine speed will be noted and the fuel supplied to the engine is modulated to maintain the speed constant.

The boom B is operated through modulation of the machines 432, 434. In order to extend the boom actuator 411, a control signal is sent from the operator 451*a* to the control 450 indicating pressure and direction. Control 450 then adjusts the reference signal 461 applied to the pressure control 463 associated with machine 432. This causes the machine 432 to increase capacity in a motoring mode and thereby reduce the pressure to the low reference pressure. The machine 434 responds through its pressure control to increase its capacity in a pumping mode and extend the cylinder 411 as described above. The rate of movement may be adjusted by modulation of the adjustment member 451*a* to obtain the required rate of movement.

Upon lowering of the boom B, there is a converse operation in which the capacity of the machine 434 is increased in a motoring mode. As the boom B is lowering, there may be a positive recovery of energy available from the fluid expelled through the machine 434 and this is transferred into the gear train 480. Again, if the energy transfer is sufficient to increase the speed of rotation of the gear train, the accumulator 488 can be supplied through the operation of the machine 486 and conversely, during a lifting cycle, fluid stored in the accumulator 488 may be applied through the machine 486 into the gear train 480 to assist in rotation of the machine 434 or machine 484.

Similar energy transfer is available from the rotation of the superstructure S by motor 482 where the inertia of the superstructure may be used to store energy in the accumulator for subsequent use. In its basic operation therefore, it will be noted that the hydraulic transmission 410 is operable to transfer energy from different consumers and to conserve energy through the use of the accumulator 488 as required. Although a rotary drive 482 has been shown for the turntable T, a drive unit similar to 502 can be used in the same manner.

The individual control of the wheels W also permits control through signal line 458 of individual wheels through monitoring the speed of rotation of the individual wheels W. In the event that one of the wheels W engages a low friction surface such as ice or mud, during acceleration or braking, its speed will differ from that of the other wheels W. The speed differential is noted by the control 450 and the capacity of that machine reduced accordingly to reduce the torque applied at that particular wheel. Under extreme conditions, the capacity of the machine will be reduced to zero so that the particular wheel may be considered to be coasting with no torque applied. However, in that condition, the pressure within the conduit 500 is maintained to the balance of the wheels thereby maintaining the traction or braking effort on those wheels. Once the wheel has decelerated, the torque may be reapplied. This permits a traction control and ABS to be implemented.

The individual drive to the wheels may also be incorporated into the steering of the vehicle by adjusting the torque applied to wheels on the same axle. Rotation of the control 451*e* produces a signal that requires the rotation of one pair of wheels at a different rate to the other. Thus, the capacity, and therefore torque, may be increased to the outside wheels requiring a higher rotational velocity supplied by the corresponding decrease made to the inside wheels. The pressure applied to each of the wheels remains constant due to the pressure compensation of the machine 484 and accordingly, an acceleration of the outside wheel occurs causing steering action of the vehicle without energy induction via machine 484.

The arrangement shown in FIG. 8 may utilize a number of different power sources such as an electric motor or an internal combustion engine that may be required to function under varying loads and operating conditions. The control of the hydraulic system of FIG. 8 may be further enhanced by integrating the control of the hydraulic drive system with the control of the prime mover, particularly where an internal combustion engine is utilised.

Figure 10:
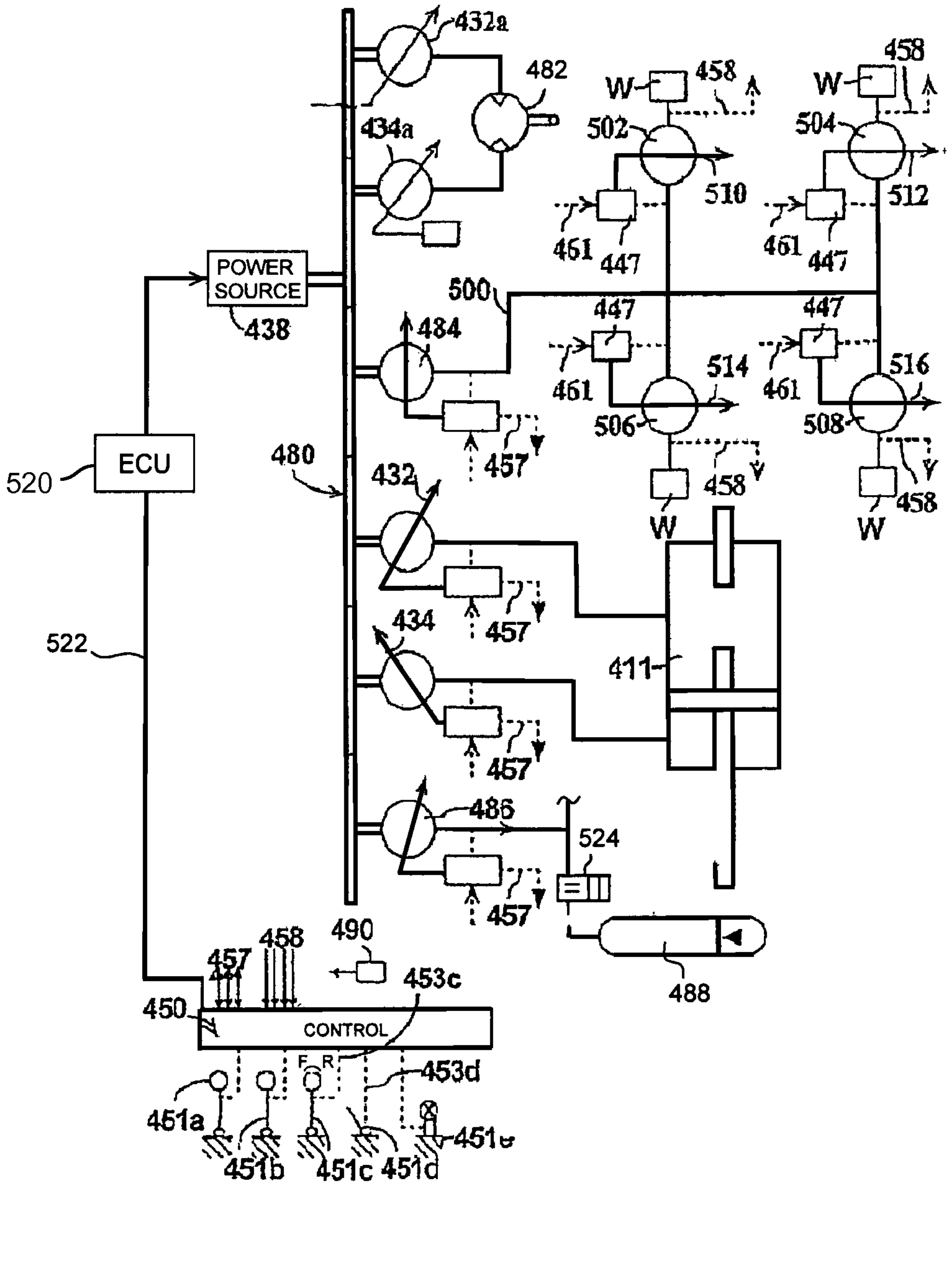
FIG. 10 is a schematic representation of a hydraulic circuit for an actuator, similar to FIG. 8, implementing an alternative control strategy.

Referring therefore to FIG. 10, a power distribution system includes a hydraulic drive system as shown in FIG. 8 is integrated with a prime mover in the form of an internal combustion engine. Like reference numerals will be used for like components to facilitate the description of the system of FIG. 10.

The prime mover is preferably an internal combustion engine, typically a diesel engine, in which the primary control of the power produced by the engine is the regulation of the fuel supply to the engine. The fuel supply is controlled by an engine control unit (ECU) 520, which is integrated with the internal combustion engine 438. The ECU 520 is an integrated software driven controller which may implement a number of different control strategies depending on the desired operating characteristics and conditions as determined from monitoring a number of inputs. Such controllers are well known and widely used with internal combustion engines and the internal organisation and operation need not be described further. In the context of the operation of the system of FIG. 10, the ECU 520, receives a command signal 522 from the control 450 in response to inputs from the manual control 451*c*. The control 451*c* has forward, neutral, and reverse (FNR) positions forwarded to the control unit 450 through the control line 453*c*, that indicates the required rotational speed of the engine and adjusts the fuel supply to the engine 438 accordingly.

An isolation valve 524 is provided between the accumulator 488 and the machine 486, which is held in a closed position when the engine is stopped and opened when the engine is running.

Assuming that the engine 438 is stopped and is to be started, the wheel drives 502-508 are commanded to a zero displacement. The machine 486 is commanded to a full motoring position and the accumulator isolator valve 524 is opened. The accumulator 488 supplies fluid under pressure to the machine 486 and rotates the engine 438 through the gear train 480.

Pressurized fluid within the accumulator 488 is supplied to the control valves associated with the respective machines to provide a response to the control 450.

The machine 486 rotates the engine 438 until a predetermined engine piston velocity has been attained, typically after one or two revolutions of the crank shaft, as determined by the rotational sensor 490 of the gear train. Once the target velocity has been acquired, the ECU 520 introduces fuel and the internal combustion engine starts. Thereafter, the engine speed will significantly increase.

The increased speed is detected by the sensor 490 and supplied to the control 450, which will provide a pressure command to the machines 432,434,432*a*, 434*a*, 484 whilst implementing an augmentation control, as described below. Provided the engine 438 has sufficient torque available, the machine 486 will be conditioned to a pumping mode to replenish hydraulic fluid in the accumulator 488 and maintain it within the required pressure and therefore volume determined by the system parameters.

The control 450 implements a control strategy that matches the torque required to run the hydraulic drive system with the engine speed necessary to provide such torque. In general terms, it does this by monitoring the net torque demands, determining whether those can be met at the present engine speed, and if not, utilises the accumulator 488 to offload the engine 438 while a new speed is attained. To facilitate the determination of engine speed, a look-up table containing the engine map of speed against torque is stored within the control 450 and the condition of the accumulator 488 monitored to ascertain the available stored energy. The engine speed may then be adjusted while there is sufficient energy reserve available to supplement the torque and offload the engine as the engine speed is adjusted. A typical strategy is described below to illustrate the implementation.

With the control 451*c* in neutral, any engine acceleration command is directed to the ECU 520 without intervention by the control 450. If the control 451*c* is not in neutral, the control 450 intercepts the speed command to the ECU 520 to maintain a required RPM of the engine 438.

If the vehicle is not moving, or is moving below a predetermined velocity, for example 5 mph, a predetermined engine RPM is commanded through the signal line 522, for example 1000 RPM. The controller 450 regulates operation of the machine 486 to recharge the accumulator 488 so that the torque required by the machine 486 never exceeds the engine torque limit for given engine RPM.

The control 450 also monitors the demands placed by the additional services, such as vehicle acceleration, boom lifting and the like, and if the load imposed on the engine 438 exceeds that available at the given RPM of the engine 438, a new, increased, engine RPM will be commanded, as will be described more fully below.

The charging of the accumulator 488 is controlled through the control unit 450 to maintain an intermediate pressure window within the accumulator. This window is determined based upon a sufficient state of charge required to transition the RPM of the engine when unloaded to that required during, for example, an aggressive acceleration when maximum accumulator consumption is anticipated. In other words, the hydraulic fluid stored within the accumulator 488 is sufficient to meet the immediate short-term requirements commanded by the controller.

The control 450 monitors the load requirements of each of the services by monitoring the displacement and pressure of the machines 432, 434, 484, as well as monitoring the operator commands providing inputs into the system. By monitoring the operator commands from controls 451, the control unit 450 can anticipate new states of the vehicles system and facilitate a rate of change control as well as presetting displacements as pressure targets are achieved. Each of these conditions will be described more fully below.

The accumulator 488 operating through the machine 486 under the control of the controller 450, therefore acts as the primary hydraulic source of energy for the entire hydraulic system and, during power consumption events, such as acceleration or lifting, the accumulator fluid will be consumed. However, the controller 450 will also be conditioning the machine 486 to replenish the accumulator 488 at a rate that does not overload the engine.

By way of example, if a vehicle acceleration event takes place as commanded by the input 451*c*, the wheel motors 502-508 will move from a neutral condition and begin to rotate. As they rotate, they consume a flow at a predefined pressure. The machine 484 increases its displacement to supply the required consumption. Rather than taking torque from the engine 438 at the rate of this acceleration, the torque is provided by supplying hydraulic fluid from the accumulator 488 to the machine 486 and through the gear train 480. Under steady conditions, the torque supplied from the machine 486 would balance the torque provided to the machine 484, but under a dynamic load, the machine 486 will respond to the dynamic changes in the torque required and will buffer the engine from rapid torque fluctuations.

As fluid is supplied from the accumulator 488, the control 450 senses the state of charge within the accumulator and anticipates the consumption of the hydraulic fluid. If it determines that the acceleration event will exceed the lower limit of the accumulator, the machine 486 increases the torque supply to the drive train 480 momentarily and thereby unloads the engine 438. As the engine is unloaded, the control 450 establishes a new RPM command for the engine, which is accelerated under a no load and therefore low fuel condition. Thereafter, the ECU 520 will maintain the engine at the set RPM and the torque available from the engine 438 is increased. The consumption of hydraulic fluid from the accumulator 488 is reduced. Depending on the state of charge of the accumulator, the engine RPM may be established to exceed the torque requirements of the machine 484 and thereby make torque available to move the machine 486 in to a pumping position and replenish the fluid in the accumulator 488.

The control of the engine 438 and the machines 432, 434, 484 and 486 is based upon a sum of the torques upon the gear train 480.

Figure 11:
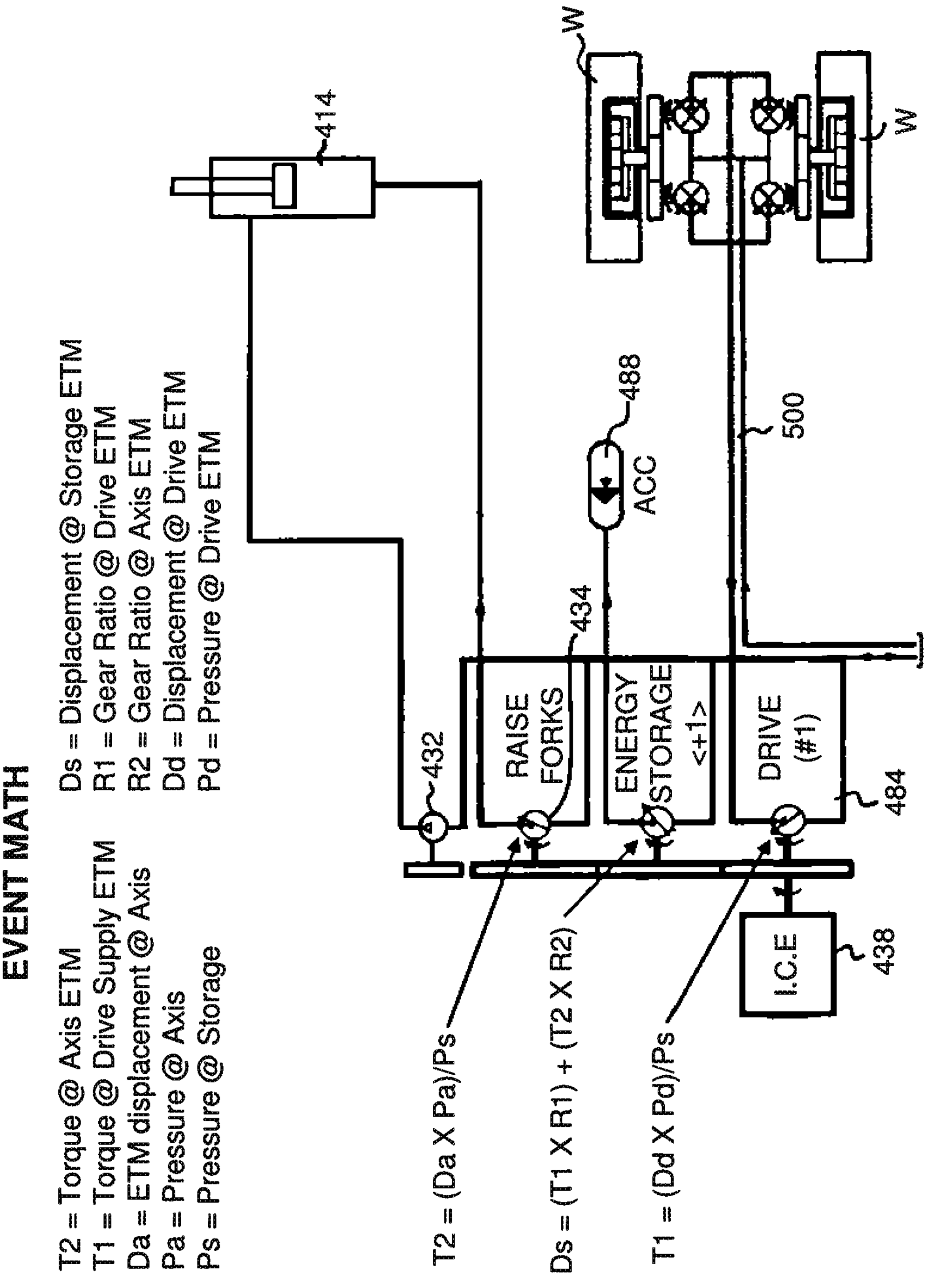
FIG. 11 is a schematic representation of a hydraulic circuit for a machine showing the torque consumptions for each service.

As shown schematically in FIG. 11, the torque imposed by the machine 484 supplying the transmission is indicated as T1 and is the product of the displacement of the machine 484 times the ratio of the pressure delivered by that machine and the pressure maintained in the accumulator 488.

Similarly, the torque imposed by an actuator 480 or 411 is the product of the displacement of the machine controlling the actuator times the ratio of the pressure of the actuator and the pressure of the accumulator. The displacement of the machine 486 and its operating pressure is indicative of the sum of the torques in the wheel drives 502, 504, 506, and 508, modified by the respective gear ratios in the train 480.

Using the example immediately above, if there is sufficient hydraulic fluid in the accumulator 488, the displacement of the machine 486 can be varied to provide the incremental torque that exceeds the torque available from the engine 438. As the accumulator 488 is depleted, a new engine RPM is commanded, but if the machine 486 can supply sufficient energy within the controlled window of the accumulator the engine will remain in its predetermined RPM.

If one of the actuators, for example 411, is lowered, a net contribution of torque would be made through the machine 432 controlling the flow of fluid from the actuator. The torque available from the machine 432 would thus be supplied to the gear train 480 and the torque required from the machine 486 reduced in direct proportion. If the recovered energy is sufficient, the displacement of the machine 486 could be commanded in to a pumping mode allowing the recovery of the energy in to the accumulator.

In a driving position, the control 450 will receive an accelerator command, which is forwarded to the drive control for the machine 484. The control associated with the machine 484 establishes a pressure proportional to the accelerator command and simultaneously commands the wheel motors 502-508 to the same proportional displacement. For example, if the accelerator command is 50% of the total capacity, then the pressure command provided to the machine 484 establishes 50% of the maximum system pressure in the conduit 500. Similarly, the capacity of the wheel motors 502-508 is 50% of the full displacement. The resultant torque at the wheel W now causes the wheel to accelerate and acceleration continues until a steady state is obtained.

As the machine 484 approaches its full capacity, the wheel motors 508 are commanded to reduce their displacements so as to maintain the system pressure established in the conduit 500. This reduces the torque available but does allow the maximum velocity to be achieved for the given command.

If the acceleration command is reduced, the pressure within the conduit 500 is proportionately reduced together with the displacements of the wheel motors 502-508.

If acceleration beyond that available from the torque established by the engine 438 is required, a new engine RPM will be commanded, as described below, and a higher pressure within the conduit 500 established. The motors 502-508 will be adjusted to a greater maximum capacity in a corresponding manner.

During coasting, when there is no acceleration or brake command, the wheel motors 502-508 are commanded to a zero displacement and the pressure target in the conduit 500 is reduced to a minimum. The coast velocity will be influenced by a number external forces, such as wind, grade etc., and either the engine will adjust the torque available or the control will adjust the RPM to deliver the required torque. In a "cruise control" setting where a selected velocity is maintained, the system will switch between motoring and driving conditions to maintain the required velocity.

Under braking, the control 450 provides a command to the machine 484 proportional to the position of the brake control 451*d*. The machine 484 is conditioned to achieve a pressure in the gallery 500 proportional to the braking command and simultaneously commands the wheel motors 502-508 to the same proportional displacement. Under this condition, the wheel motors 502-508 are conditioned as pumps to drive the machine 484. The machine 484 is also conditioned to a motoring mode in which it is driven by the wheel motors 502-508 and delivers torque to the gear train 480.

The torque supplied to the gear train is used to replenish the accumulator 488 by conditioning the machine 486 in to a pumping mode. The braking energy is therefore used to replenish the accumulator 488.

If a maximum braking command is received and the machine 484 attains a maximum displacement, the wheel motors 502-508 are commanded to reduce their displacement so as maintain the pressure in the conduit 500 at the maximum pressure permitted.

In one control strategy, if the braking input from the control 451*d* remains the same, the vehicle will come to a stop and then begin accelerating in the opposite direction. Energy will then be taken from the accumulator during the acceleration event as the machine 484 is now absorbing torque, rather than contributing torque.

If the braking input is changed during the braking event, a new braking effort will be established based on a new pressure target, and the displacements of the wheel motors 502-508 correspondingly adjusted.

If braking is continued until the vehicle comes to a complete stop, and the braking command is then reduced to zero, automatically or manually, the pressure signal for the machine 484 is reduced to a minimal limit and the wheel motors 502-508 are commanded to a zero displacement. At this point, the vehicles mechanical brakes may be applied to hold the vehicle at zero velocity.

The interaction with the machines controlling the actuators 411, 484 is similar in that the control from the service, for example 451*a* or 451*b*, which commands the appropriate one of the machines 432, 434, 432*a*, 434*a*, to a maximum capacity based on the input from the controller. The velocity of the actuators 411, 482 is a function of the displacement and pressure at the respective machines 432, 434, 432*a*, 434*a* and the engine RPM. When an actuator command is accessed, the control 450 references a table that determines whether the velocity commanded by the control is available at the current engine RPM. If the velocity is not available, the RPM is increased, as described below, so that the velocity can be attained.

The command for the actuator 411, 432 is pressure limited so that if the load exceeds a maximum system pressure, the machine producing the lift will be de-stroked so as to maintain the maximum system pressure.

Movement of the actuator 411 in a direction in which energy is contributed to the power train 480 proceeds in a similar manner with a net contribution to the gear train 480 which can be absorbed within the accumulator 488.

In order to properly control the rotational speed of the engine 438, the control 450 monitors the state of charge within the accumulator 488. As the lower limit of the state of charge is approached, the machine 486 is adjusted to supply additional torque to the gear train 480 and momentarily unload the engine. As noted above, the new engine RPM is established on the command signal 522. The response to the new RPM is predetermined and depends upon the vehicle and duty cycle.

In typical examples, the nominal engine speed may be 1000 RPM. For the speed torque map for the particular engine, the torque production must be capable of keeping the accumulator 488 within a window in which it can supply energy to the gear train 480 with the vehicle operating up to a predetermined velocity, for example 5 mph.

If the vehicle is commanded to exceed 5 mph, a new RPM level is employed, for example the peak torque for the engine. This will allow a maximum torque to be taken from the engine at any given time, but may only allow a velocity of, for example, 8 mph.

If the vehicle is commanded to exceed 8 mph, the command signal 522 determines a higher RPM, for example 1800 RPM, but this produces less than a peak torque.

If still greater velocity is required, a further engine level may be employed to provide the maximum vehicle velocity, although typically the torque available will be reduced.

At each change of engine RPM, the engine is unloaded by supplying torque through the accumulator 488 via machine 486, and then reducing the contribution from the accumulator 488 as the new engine speed is attained.

Similarly, as the vehicle velocity is reduced, the engine RPM is similarly reduced in stages until the nominal engine speed of 1000 RPM is attained.

The control 450 is monitoring the additional loads placed on the engine due to other services being used, for example vehicle transmission and a lift of the boom, and upon determining that insufficient torque is available, the engine RPM will be adjusted. Once the additional service has been completed, a lower RPM will again be commanded.

Accordingly, the control 450 may integrate the control of the hydraulic drive system with the operating characteristics of the prime mover 438 and may utilize the stored energy within an accumulator 488 in an expeditious and effective manner.

What is claimed is:

1. A method of controlling power distribution in a power transmission system having a prime mover drivingly connected to a hydraulic drive system, said hydraulic drive system including an accumulator to store energy and an adjustable hydraulic machine to transfer energy between said accumulator and said prime mover, said method comprising the steps of:

determining a load imposed on said prime mover by said hydraulic drive system, comparing the load to an output of the prime mover to determine whether a change of operating condition of the prime mover is warranted, upon determining a change is warranted, supplying energy from said accumulator to offload said prime mover, and changing the operating condition of the prime mover whilst the load is reduced, wherein control of the prime mover is integrated with control of the hydraulic drive system, wherein the integration of control of the prime mover with control of the hydraulic drive system comprises a control unit integrated with the prime mover.

2. The method according to claim 1 wherein determining said load includes monitoring a torque imposed on said prime mover by said hydraulic drive system.

3. The method according to claim 2 wherein said torque is determined by monitoring operating conditions of hydraulic machines incorporated in said hydraulic drive system.

4. The method according to claim 1 wherein the energy stored in said accumulator is monitored and upon detection of a predetermined condition, the energy stored in said accumulator is utilised to offload said prime mover and said operating condition of said prime mover is changed to permit replenishment of said accumulator.

5. The method according to claim 1 wherein said prime mover is an internal combustion engine and said change in operating condition is effected by adjustment of a fuel supply.

6. A power distribution system comprising:

a prime mover, a hydraulic drive system including an accumulator to store energy and an adjustable hydraulic machine to transfer energy between said accumulator and said prime mover, a controller to monitor loads imposed on said prime mover by said hydraulic drive system, said controller being operable to compare the loads to output of the prime mover, determine whether a change of operating condition of the prime mover is warranted, and adjust said adjustable hydraulic machine to supply energy from said accumulator and offload said prime mover during change of operating condition of said prime mover, and an isolation valve disposed between the accumulator and the adjustable hydraulic machine, the isolation valve being controllable by the controller, wherein said controller is configured as an integration of control of the prime mover and control of the hydraulic drive system.

7. The power distribution system according to claim 6 wherein said controller monitors torque imposed on said prime mover by said hydraulic drive system.

8. The power distribution system according to claim 7 wherein said hydraulic drive system includes a plurality of hydraulic machines and said controller monitors operating parameters of said machines to ascertain the torque imposed on said prime mover.

9. The power distribution system according to claim 6 wherein said hydraulic drive system and said prime mover are connected by a mechanical transmission.

10. The power distribution system according to claim 9 wherein said adjustable hydraulic machine is configured to transfer energy between said accumulator and said prime mover through said mechanical transmission.

11. The power distribution system according to claim 6 wherein said prime mover is an internal combustion engine.

12. The power distribution system according to claim 11 wherein said controller operates through a fuel supply to change the operating condition of said engine.

13. The power distribution system according to claim 6, wherein the isolation valve is held in a closed position when the prime mover is stopped and is held in an open position when the prime mover is running.

14. A method of controlling power distribution in a power transmission system having a prime mover drivingly connected to a hydraulic drive system, said hydraulic drive system including an accumulator to store energy and an adjustable hydraulic machine to transfer energy between said accumulator and said prime mover, said method comprising the steps of:

determining a load imposed on said prime mover by said hydraulic drive system, comparing the load to an output of the prime mover to determine whether a change of operating condition of the prime mover is warranted, upon determining a change is warranted, supplying energy from said accumulator to offload said prime mover, changing the operating condition of the prime mover whilst the load is reduced, wherein control of the prime mover is integrated with control of the hydraulic drive system, and controlling an isolation valve disposed between the accumulator and the adjustable hydraulic machine.

15. The method according to claim 14, wherein the isolation valve is held in a closed position when the prime mover is stopped and is held in an open position when the prime mover is running.

* * * * *